F. J. Seymour,

Picture Nail Head.

No. 2,967. Reissued June 2, 1868.

Witnesses:

Chas. H. Smith

Inventor:

F. J. Seymour.

per L. M. Sewell Atty

United States Patent Office.

TURNER, SEYMOUR, & JUDDS, OF WOLCOTTVILLE, CONNECTICUT, ASSIGNEES OF FREDERICK J. SEYMOUR, OF SAME PLACE.

*Letters Patent No.* 55,911, *dated June* 26, 1866; *reissue No.* 2,967, *dated June* 2, 1868.

IMPROVEMENT IN MODE OF ATTACHING ORNAMENTAL HEADS TO NAILS.

The Schedule referred to in these Letters Patent and making part of the same.

TO ALL WHOM IT MAY CONCERN:

Be it known that FREDERICK J. SEYMOUR, of Wolcottville, in the county of Litchfield, and State of Connecticut, has invented, made, and applied to use a certain new and useful Improvement in Picture-Nails; and the following is hereby declared to be a full, clear, and exact description of the said invention, reference being had to the annexed drawing, making part of this specification, wherein—

Similar letters denote the same parts, and the figures are shown larger than the usual size of nail.

Figure 1:
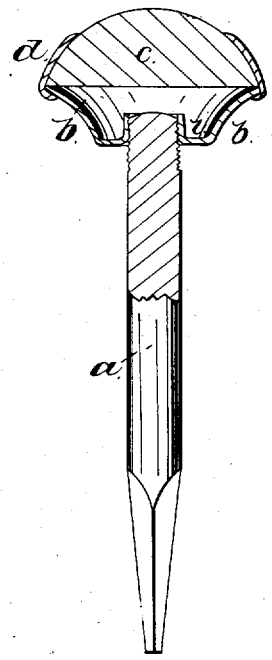
Figure 1 is a longitudinal section of said improved picture-nail.
Figure 2:
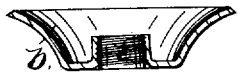
Figure 2 is a section of the metallic body or back of the nail-head.
Figure 3:
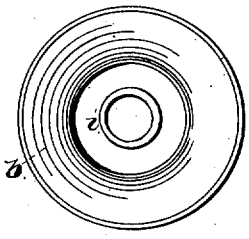
Figure 3 is an elevation of the same.

Picture-nails have heretofore been extensively manufactured with a removable head, the nail itself, that is driven into the wall, having a screw-end, upon which the ornamental head is screwed after the nail has been driven. These ornamental heads have been formed with a separate nut attached within the hollow head, and sometimes soft metal has been cast within the body of the head, around the screwed end of the nail. These modes of manufacture are expensive, and consume considerable metal in the nuts, and the nut is liable to get loose.

The nature of the said invention consists in a picture-nail formed with a metal back for the ornamental end or head, which metal back is made with a cylindrical projection, receiving within it the screw-thread to take the nail. Thus the screw-thread is formed out of the metal of the body that ordinarily would be removed in perforating the metal of the back of the head, for the nail to pass into the head, thereby effecting a saving in the cost, and forming a nut that is part of the metallic back of the nail-head, and not liable to become loose, as heretofore.

In the drawing, *a* is the nail, with the screwed end, as usual. *b* is the metallic back or body of the ornamental nail-head, to which the porcelain disk or button *c* is to be secured by the ornamental ring *d*, as usual.

In the centre of the body or back, *b*, is an opening, formed by perforating and stretching the metal, to form a short cylinder or teat, *i*, and the inner surface is provided with a screw-thread to fit the end of the nail *a*. The metal composing the back or body *b* should be sufficiently thick to allow of its being stretched, to form this cylinder *i*, nearly as long as the diameter of the hole through said cylinder.

This improved picture-nail is a cheaper and much better article than those heretofore made, as mentioned above, and is a new and useful article of manufacture.

What is claimed, and desired to be secured by Letters Patent, is—

An ornamental picture-nail head, made with a sheet-metal body or back, having within it a screw-thread for the nail, substantially as specified.

In witness whereof, we have hereunto set our signatures, this 22d day of April, 1868.

TURNER, SEYMOUR, & JUDDS.

Witnesses:

CHAS. H. SMITH,

GEO. T. PINCKNEY.